United States Patent
Kimura

(10) Patent No.: US 10,571,545 B2
(45) Date of Patent: Feb. 25, 2020

(54) LOCATION SEARCH METHOD USING A PHONE IN MULTIPLE LOCATIONS

(71) Applicant: Renesas Electronics America Inc., Santa Clara, CA (US)

(72) Inventor: Toshio Kimura, Cupertino, CA (US)

(73) Assignee: Renesas Electronics America Inc., Santa Clara, CA (US)

(*) Notice: Subject to any disclaimer, the term of this patent is extended or adjusted under 35 U.S.C. 154(b) by 0 days.

(21) Appl. No.: 15/876,282

(22) Filed: Jan. 22, 2018

(65) Prior Publication Data

US 2018/0213352 A1    Jul. 26, 2018

Related U.S. Application Data

(60) Provisional application No. 62/449,171, filed on Jan. 23, 2017.

(51) Int. Cl.
*G01S 5/02*    (2010.01)
*H04W 4/02*    (2018.01)

(52) U.S. Cl.
CPC ............. *G01S 5/0252* (2013.01); *H04W 4/02* (2013.01)

(58) Field of Classification Search
CPC .................................. H04W 4/02; G01S 5/0252
USPC ............................................................ 455/456.3
See application file for complete search history.

(56) References Cited

U.S. PATENT DOCUMENTS

| | | | |
|---|---|---|---|
| 8,805,404 B1* | 8/2014 | Yang ....................... | H04W 4/02 455/456.1 |
| 2011/0195701 A1* | 8/2011 | Cook ..................... | G01S 5/0018 455/422.1 |
| 2014/0018111 A1* | 1/2014 | Farley .................... | H04W 4/023 455/456.6 |
| 2016/0088584 A1* | 3/2016 | Kudekar ............. | H04W 64/003 455/456.2 |
| 2016/0301849 A1* | 10/2016 | E ......................... | H04M 1/72533 |

* cited by examiner

*Primary Examiner* — Anthony S Addy
*Assistant Examiner* — Farid Seyedvosoghi
(74) *Attorney, Agent, or Firm* — Foley & Lardner LLP

(57) ABSTRACT

A location search method using a mobile device in multiple locations. In one embodiment of the method, the mobile device receives a first radio frequency (RF) signal transmitted by a first device while the mobile device is at a first geographical location. The mobile device receives a second RF signal transmitted by the first device while the mobile device is at a second geographical location, which is different from the first mobile device geographical location. The mobile device determines a geographical location of the first device based on the first RF signal, the second RF signal, the first mobile device geographical location, and the second mobile device geographical location.

10 Claims, 4 Drawing Sheets

LOCATION SEARCH METHOD USING A PHONE IN MULTIPLE LOCATIONS

RELATED APPLICATIONS

This application claims the domestic benefit under Title 35 of the United States Code § 119(e) of U.S. Provisional Patent Application Ser. No. 62/449,171, entitled "Location Search Method Using a Phone in Multiple Locations," filed Jan. 23, 2017, which is hereby incorporated by reference in its entirety and for all purposes as if completely and fully set forth herein.

BACKGROUND

People lose important objects like wallets. It would be helpful to provide a simple means to identify the location or position of lost objects. Tacking systems provide a means for tracking lost objects using mobile RF transmitting devices (hereinafter tracking devices). Unfortunately these tracking systems are limited in their abilities, and complicated and expensive to set up.

SUMMARY

A location search method using a mobile device in multiple locations. The method can be used to identify the graphical location of a device that transmits a radio frequency (RF) signals. In one embodiment of the method, the mobile device receives a first RF signal transmitted by the first device while the mobile device is at a first geographical location. The mobile device receives a second RF signal transmitted by the first device while the mobile device is at a second geographical location, which is different from the first mobile device geographical location. The mobile device determines the geographical location of the first device based on the first RF signal, the second RF signal, the first mobile device geographical location, and the second mobile device geographical location. The mobile device can display a map with a visual indication that identifies the geographical location of the first device.

BRIEF DESCRIPTION OF THE DRAWINGS

The present invention may be better understood in its numerous objects, features, and advantages made apparent to those skilled in the art by referencing the accompanying drawings.

The use of the same reference symbols in different drawings indicates similar or identical items.

DETAILED DESCRIPTION

Electronic tracking devices are used by people to find objects they lose. A user can attach a tracking device to commonly lost objects, such as wallets or sets of keys. The tracking device announces itself by emitting a radio frequency (RF) signal, which can be detected by a mobile device (e.g., smart phone) if it is within signal range. In response to detecting the RF signal the mobile device can display a map with a visual indication pointing to the tracking device's geographical location. The displayed map may also provide a visual indication of the mobile device's location as a reference point for the user. The map helps the user to find her lost wallet or set of keys.

Figure 1:
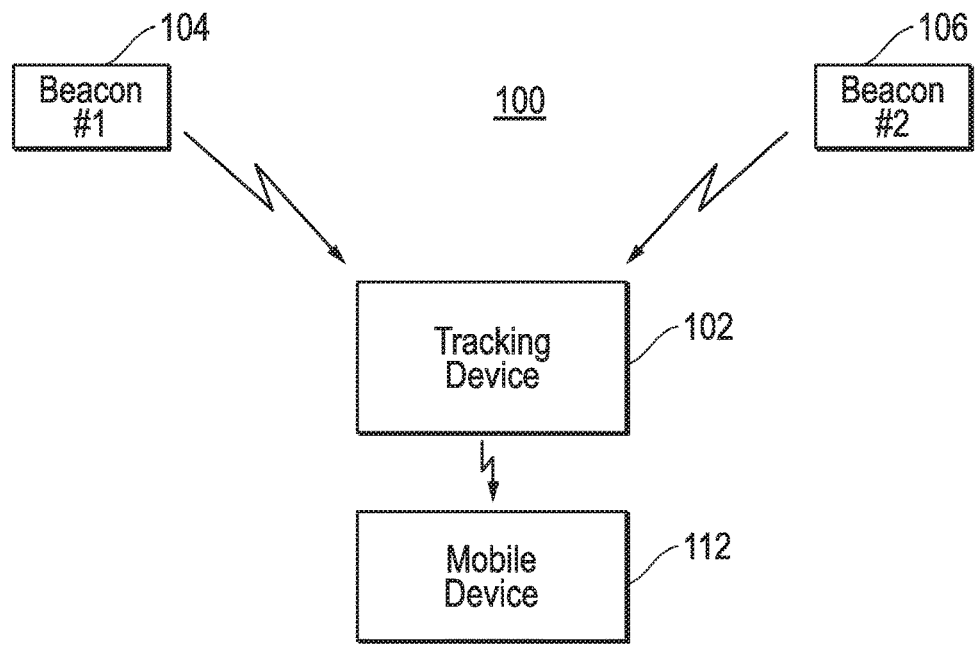
FIG. 1 is a block diagram illustrating an example tracking system.

FIG. 1 illustrates an example tracking system 100 including a tracking device 102, which is attached to an object such as a wallet (not shown). System 100 also includes beacons 104 and 106 that are in wireless data communication with tracking device 102. Beacons 104 and 106 are installed at fixed geographical locations in an environment such as a school, office building, shopping mall, etc. Beacons 104 and 106 transmit RF signals that are detected by an RF transceiver of tracking device 102 if tracking device 102 is within range. The RF signals transmitted by beacons 104 and 106 contain information that can be to calculate tracking device 102's geographical location. For example, the information transmitted by beacons 104 and 106 may include identities of their respective, fixed geographical locations. For the purposes of explanation only, a geographical location is defined by longitude and latitude, which are angles that uniquely define points on the earth; longitude lines are perpendicular and latitude lines are parallel to the earth's equator. Together, the angles comprise a coordinate scheme that can locate or identify geographic locations on the surface of the earth. Geographical location may be additionally defined by elevation (e.g., height above sea level). For purposes of explanation only, the term geographical location will be limited to coordinates in longitude and latitude. The remaining description uses the terms location and geographical location interchangeably.

Tracking device 102 can extract the location (e.g., longitude and latitude) that is encoded within each RF signal it receives from beacons 104 or beacon 106. In addition, tracking device 102 can calculate a received signal strength indicator (RSSI) for each of the RF signals it receives from beacons 104 and 106. RSSI is a measurement of the power present in a received RF signal. RSSI decreases as RF signals travel from their sources; the farther away from the source, the lower the RSSI. Tracking device 102 can use RSSI to determine the distance between tracking device 102 and the RF signal source. Thus, tracking device 102 can calculate its distance to each of the beacons 104 and 106 using the RSSIs it calculates from the RF signals transmitted by beacons 104 and 106. Tracking device 102 can then calculate its geographical location using distances from beacons 104 and 106, and the geographical locations of beacons 104 and 106 that were extracted from the RF signals received therefrom. Thereafter the tracking device 102 transmits an RF signal that contains the geographical location it calculated for itself. Mobile device 112 can receive and extract the geographical location from the RF signal transmitted by tracking device 102 if mobile device 112 is within range. The geographical location can be provided to a mapping function of mobile device 112. Ultimately, mobile device 112 displays a map with a visual indication that identifies the location of tracking device 102 that was provided to the mapping function. A user of mobile device 112 can use the map to find item (e.g., wallet) to which tracking device 102 is attached.

There are several disadvantages to the tracking system 100 shown in FIG. 1. Tracking system 100 is dependent upon fixed location beacons 104 and 106, which are expensive to purchase, install and configure for proper operation. More importantly, if tracking device 102 is not within range of beacons 104 and 106, tracking device 102 cannot detect RF signals generated by the beacons, and as a result tracking device 102 will be unable to calculate its geographical location. In other words, a user of mobile device 112 will be unable to find her lost wallet unless the wallet, and attached tracking device 102, is near beacons 104 and 106.

The present invention provides an alternative tracking system Importantly, the tracking system of the present invention does not rely on beacons 104 and 106 in order to identify the location of a lost object to which a tracking device is attached. In one embodiment, a method of the present invention can be implemented on a mobile device that can detect RF signals generated by the tracking device. These concepts will be more fully described below.

Figure 2:
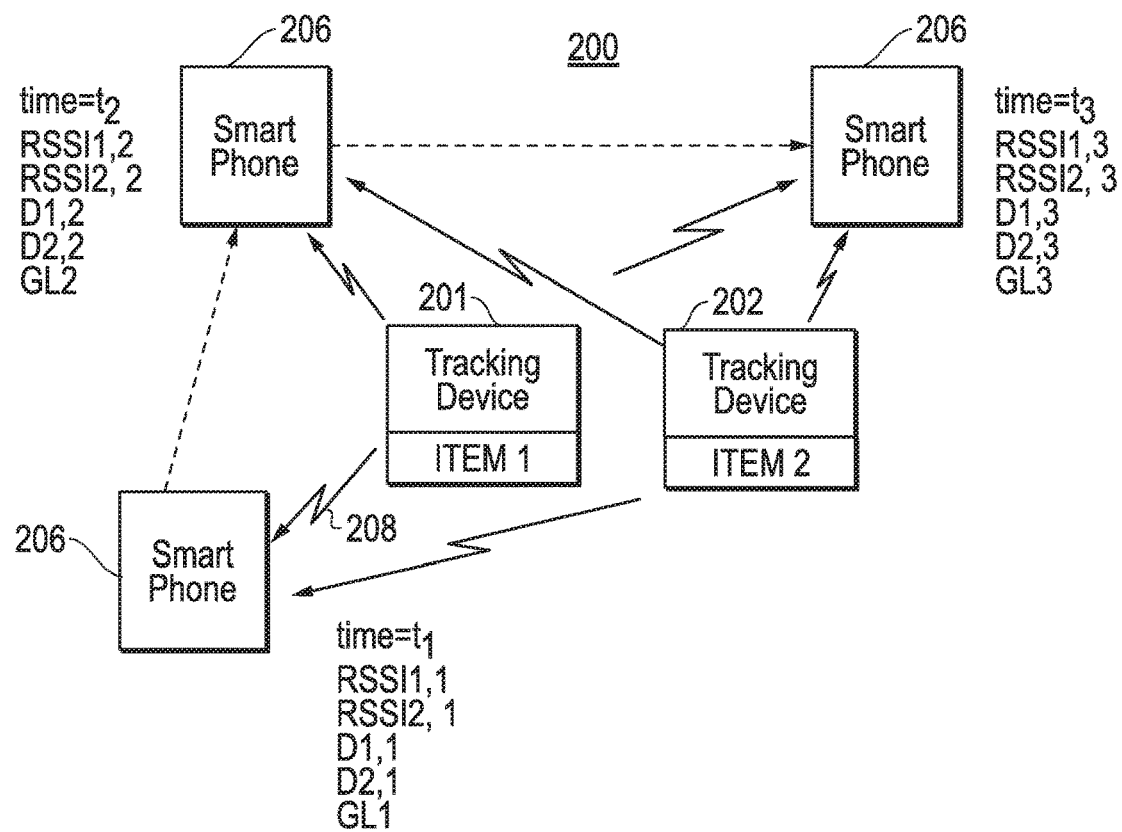
FIG. 2 is a block diagram illustrating an example tracking system employing one embodiment of the present invention.

FIG. 2 illustrates one embodiment of the present invention. FIG. 2 shows tracking devices 201 and 202 attached to items 1 and 2, respectively. Some details of the present invention will be described with respect to both tracking devices 201 and 202. Other details of the present invention will be described only with reference to tracking device 201. However, concepts described with reference to tracking device 201 apply equally to tracking device 202. Tracking devices 201 and 202 are in wireless communication with mobile device 206 (e.g., smart phone). For purposes of explanation only, the present invention will be described with reference to smart phones, it being understood the present invention should not be limited thereto.

Each of tracking devices 201 and 202 includes battery powered components, at least one of which repeatedly broadcast RF signals, such as RF signal 208. The RF signals contain information about tracking devices 201 and 202. Importantly, the RF signals contain respective identifications of tracking devices 201 and 202. In some embodiments, the RF signals may include additional information. For example, tracking devices 201 and 202 include batteries and an integrated circuit (e.g., a fuel gauge) that constantly measures and monitors the batteries. Tracking devices 201 and 202 can generate RF signals that include information indicating the level of energy in their respective batteries as measured by their fuel gauges. Additional tracking device information may be included in the RF signals transmitted by tracking devices 201 and 202.

Smart phone 206 is mobile and can be moved from location to location. Smart phone 206 is shown and its operation will be described at three distinct geographical locations at three different times t1-t3, respectively. Smart phone 206 is assumed to be close enough to tracking devices 201 and 202 to receive the RF signals they transmit. At each of the three geographical locations, smart phone 206 also receives RF signals from Global Positioning System (GPS) satellites (not shown). The RF signals transmitted by GPS satellites will be referred to herein as the GPS signals. The GPS signals contain information that smart phone 206 can use to calculate its geographical location. The present invention will be described with reference to smart phone 206 determining its geographical location using GPS signals from GPS satellites, it being understood the present invention should not be limited thereto. In an alternative embodiment, for example, smart phone 206 can calculate its geographical location using information contained in RF signals received from one or more base transceiver stations (BTSs, also known as "cell phone towers").

Smart phone 206 is shown in FIG. 2 at a first geographical location at time t1. While there smart phone 206 receives GPS signals. Smart phone 206 calculates its geographical location GL1 using the GPS signals it receives at time t1 using methods well known in the art. While at GL1, smart phone also receives RF signals from tracking devices 201 and 202. Smart phone 206 extracts the identities of tracking devices 201 and 202 from information contained in the RF signals. Smart phone 206 also calculates RSSI1,1 and RSSI2,1 using the RF signals received from tracking devices 201 and 202, respectively. As noted above, RSSI can be used to determine the distance to a source of RF signals. RSSI is dependent on the distance D to a tracking device and the power at which the tracking device transmits its RF signal. In one embodiment, RSSI is defined as $RSSI = TxPower - 10*n*Lg(D)$, where n=2 in free space, and TxPower is the power at which the tracking device transmits its RF signal. Rearranging terms leads to a relationship $D = 10^{\wedge}((TxPower - RSSI)/(10*n))$, which can be used by smart phone 206 to calculate distance D.

Smart phone 206 calculates its distance D1,1 to tracking device 201 based upon RSSI1,1, and smart phone 206 calculates its distance D2,1 to tracking device 202 based upon RSSI2,1. Smart phone 206 maps the identities of tracking devices 201 and 202 to D1,1 and D2,1, respectively, in memory. The memory of smart phone 206 also maps the identities of tracking devices 201 and 202 to items 1 and 2, respectively.

Figure 3:
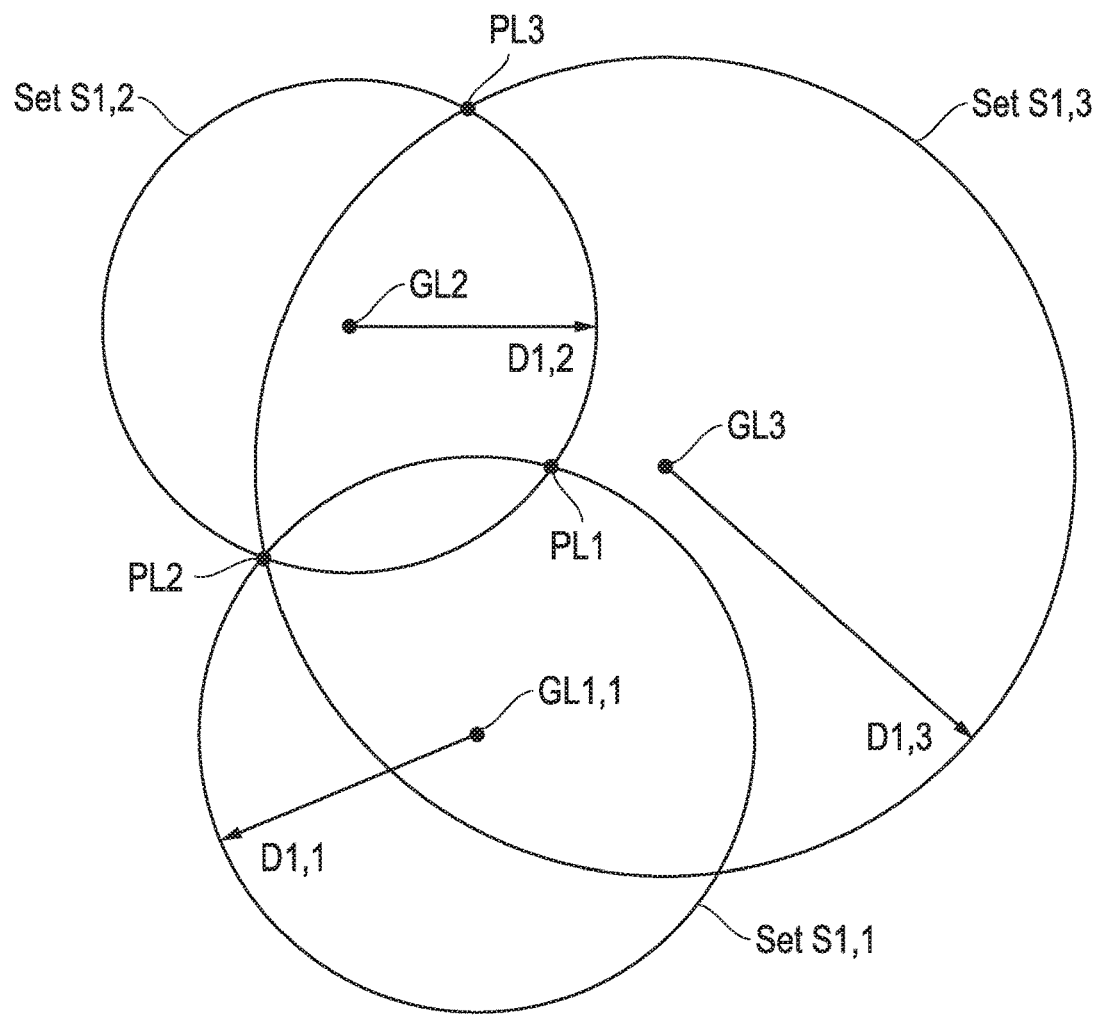
FIG. 3 illustrates graphical representations of sets of possible geographical locations for a tracking device shown in FIG. 2.

Smart phone 206 cannot calculate the actual geographical location of tracking device 201 based only on D1,1 and GL1. Nor can smart phone 206 calculate the actual geographical location of tracking device 202 based only on D2,1 and GL1. However, smart phone 206 can calculate a set S1,1 of possible geographical locations for tracking device 201 based upon D1,1 and GL1, and smart phone 206 can calculate a set S2,1 of possible geographical locations for tracking device 202 based upon D2,1 and GL1. Each possible geographical location can be expressed as a longitude and latitude pair. FIG. 3 illustrates a graphical representation of set S1,1. In the illustrated example, set S1,1 is represented by a circle of locations that is centered at GL1, the geographical location of smart phone 206 at time t1. Each of the potential geographical locations for tracking device 201 is the same distance D1,1 from GL1. The number of possible geographical locations calculated for each set may depend on the distance D to the tracking device, with the number of possible geographical locations increasing with an increase in distance D. FIG. 3 does not show a graphical representation of set S2,1.

Smart phone 206 cannot determine the precise geographical locations of tracking devices 201 and 202 based solely on S1,1 and S2,1, respectively. However a user can move smart phone 206 to a new geographical location, where smart phone 206 can essentially repeat the same process described above to generate additional information that can be used in conjunction with S1,1 and S2,1 to narrow down the possible geographical locations of tracking devices 201 and 202. With continuing reference to FIGS. 2 and 3, smart phone 206 is moved to a second geographical location at time t2. While at the second geographical location smart phone 206 receives GPS signals from GPS satellites. Smart phone 206 calculates its geographical location GL2 using the GPS signals detected at time t2. While at GL2 smart phone also receives new RF signals from tracking devices 201 and 202. Smart phone 206 determines the identities of tracking devices 201 and 202 from information contained in the newly received RF signals. Smart phone 206 calculates $RSSI_{1,2}$ and $RSSI_{2,2}$ from the RF signals received from tracking devices 201 and 202, respectively. $RSSI_{1,2}$ and $RSSI_{2,2}$ should be different in magnitude when compared to $RSSI_{1,1}$ and $RSSI_{2,1}$, respectively. Smart phone 206 calculates its distance $D_{1,2}$ to tracking device 201 based upon the $RSSI_{1,2}$, and smart phone 206 calculates its distance $D_{2,2}$ to tracking device 202 based upon the $RSSI_{2,2}$. Smart phone 206 maps the identities of tracking devices 201 and 202 to $D_{1,2}$ and $D_{2,2}$, respectively, in memory.

Smart phone 206 generates a second set $S_{1,2}$ of possible geographical locations for tracking device 201 based upon $D_{1,2}$ and GL2, and smart phone 206 generates a second set $S_{2,2}$ of possible geographical locations for tracking device 202 based upon $D_{2,2}$ and GL2. FIG. 3 illustrates a graphical representation of the second set $S_{1,2}$ of possible geographical locations calculated by smart phone 206 for tracking device 201. In the illustrated example, second set $S_{1,2}$ is represented by a second circle that is centered at GL2, the geographical location of smart phone 206 at time t2. Each of the potential geographical locations for tracking device 201 is the same distance $D_{1,2}$ from GL2.

FIG. 3 shows that two possible geographical locations for tracking device 201 are common to the first and second sets $S_{1,1}$ and $S_{1,2}$, respectively. These two possible geographical locations are represented by the intersections of the circles that represent sets $S_{1,1}$ and $S_{1,2}$. Tracker device 201 should be present at or near one of the two possible geographical locations. Smart phone 206 can further narrow down the number of possible geographical locations of tracking devices 201 and 202 with additional information. To that end the user moves smart phone 206 to another geographical location, where smart phone 206 repeats the process described above. More particularly, smart phone 206 is moved to a third geographical location at time t3. While at the third geographical location smart phone 206 receives GPS signals from GPS satellites. Smart phone 206 calculates its third geographical location GL3 using the GPS signals. While at GL3 smart phone 206 receives new RF signals from tracking devices 201 and 202. Smart phone 206 calculates $RSSI_{1,3}$ and $RSSI_{2,3}$ based on the RF signals received from tracking devices 201 and 202, respectively. Smart phone 206 calculates its distance $D_{1,3}$ to tracking device 201 based upon the $RSSI_{1,3}$, and smart phone 206 calculates its distance $D_{2,3}$ to tracking device 202 based upon the $RSSI_{2,3}$. Smart phone 206 generates a third set $S_{1,3}$ of possible geographical locations for tracking device 201 based upon $D_{1,3}$ and GL3, and smart phone 206 generates a third set $S_{2,3}$ of possible geographical locations for tracking device 202 based upon $D_{2,3}$ and GL3. FIG. 3 illustrates a graphical representation of the third set $S_{1,3}$ of possible geographical locations of tracking device 201. In the illustrated example, set $S_{1,3}$ is represented by a circle that is centered at GL3. Each of the potential geographical locations for tracking device 201 in the third set $S_{1,3}$ is the same distance $D_{1,3}$ from GL3 in the illustration.

Figure 4:
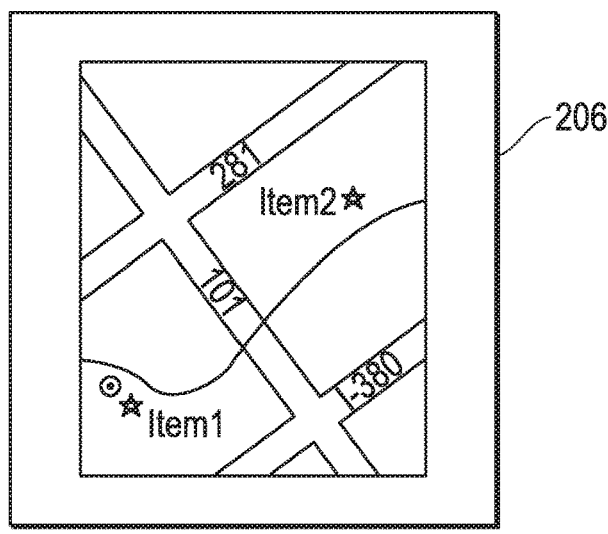
FIG. 4 illustrates an example map displayed by a mobile device, which visually indicates locations of the smart phone and the tracking devices shown in FIG. 2.

As noted, smart phone 206 cannot determine the geographical location of tracking device 201 based only on one set of possible geographical locations such as $S_{1,1}$. However, as shown in the graphical representations of FIG. 3, multiple sets of possible geographical locations may have one or more common possible geographical locations for tracking device 201. Smart phone 206 can compare the sets for tracking device 201 to identify at least one entry in each that is the same or substantially similar. For example, smart phone 206 can compare the possible geographical locations of sets $S_{1,1}$ and $S_{1,2}$, and identify two possible locations PL1 and PL2 (see, FIG. 3) common to each. Presuming tracking device 201 has not moved since the generation of sets $S_{1,1}$ and $S_{1,2}$, tracking device 201 should be located at or near geographical location PL1 or PL2. The geographical location of tracking device 201 can be narrowed down from PL1 and PL2 using one or more additional sets of possible geographical locations. For example, smart phone 206 can compare the possible geographical locations of set $S_{1,3}$ with PL1 and PL2. FIG. 3 shows that PL2 is common to each of the sets $S_{1,1}$, $S_{1,2}$ and $S_{1,3}$. In the illustrated example, smart phone 206 determines that PL2 is the geographical location of tracking device 201. PL2, which can expressed as a longitude and latitude, can be provided to a mapping function on smart phone 206, which in turn can display a map on a touch screen, which has a visual indication that item 1 attached to tracking device 201 is located at PL2. FIG. 4 illustrates an example touch screen of smart phone 206 that displays a map with a visual indication of the locations of items 1 and 2, which are attached to tracking devices 201 and 202, respectively. The map also includes a visual indication of smart phone 206's location as a reference point for the user. This visual indication is represented by the circled dot next to item 1. The map enables the user to locate objects attached to tracking devices 201 and 202. The user can zoom in or out to give proper map granularity. Importantly, smart phone 206 enables the user to locate lost objects without use of beacons 104 and 106.

Figure 5:
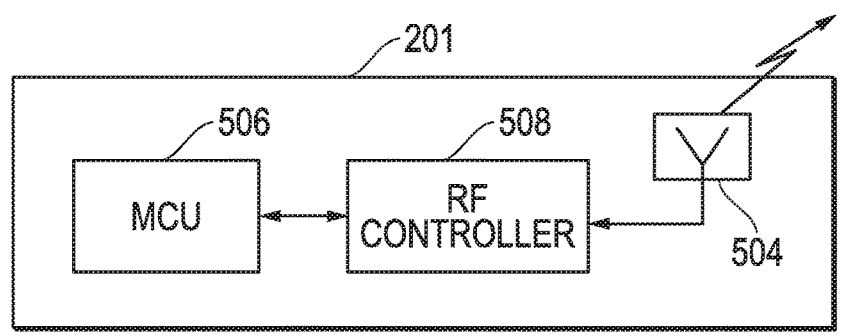
FIG. 5 is a block diagram illustrating relevant components of an example tracking device.

With continuing reference to FIG. 2, FIG. 5 illustrates an example tracking device 201. The tracking devices employed in the present invention can be more simplified when compared to tracking device 102 described above since tracking device 201 need not calculate its geographical location based on RF signals from beacons such as beacons 104 and 106. As shown in FIG. 5, tracking device 201 includes an RF controller circuit 502 in data communication with an RF antennae 504 and a microcontroller unit (MCU) 506. MCU 506 periodically outputs data that includes, for example, an identity of tracking device 201. The data output from MCU 506 may include additional information such as battery level of a battery providing power to tracking device 201. The data output from MCU 506 is provided to RF controller circuit 502 for processing. RF controller circuit 502 converts the data it receives from MCU 506 into an analog signal, which in turn is transmitted as an RF signal via antennae 504.

Figure 6:
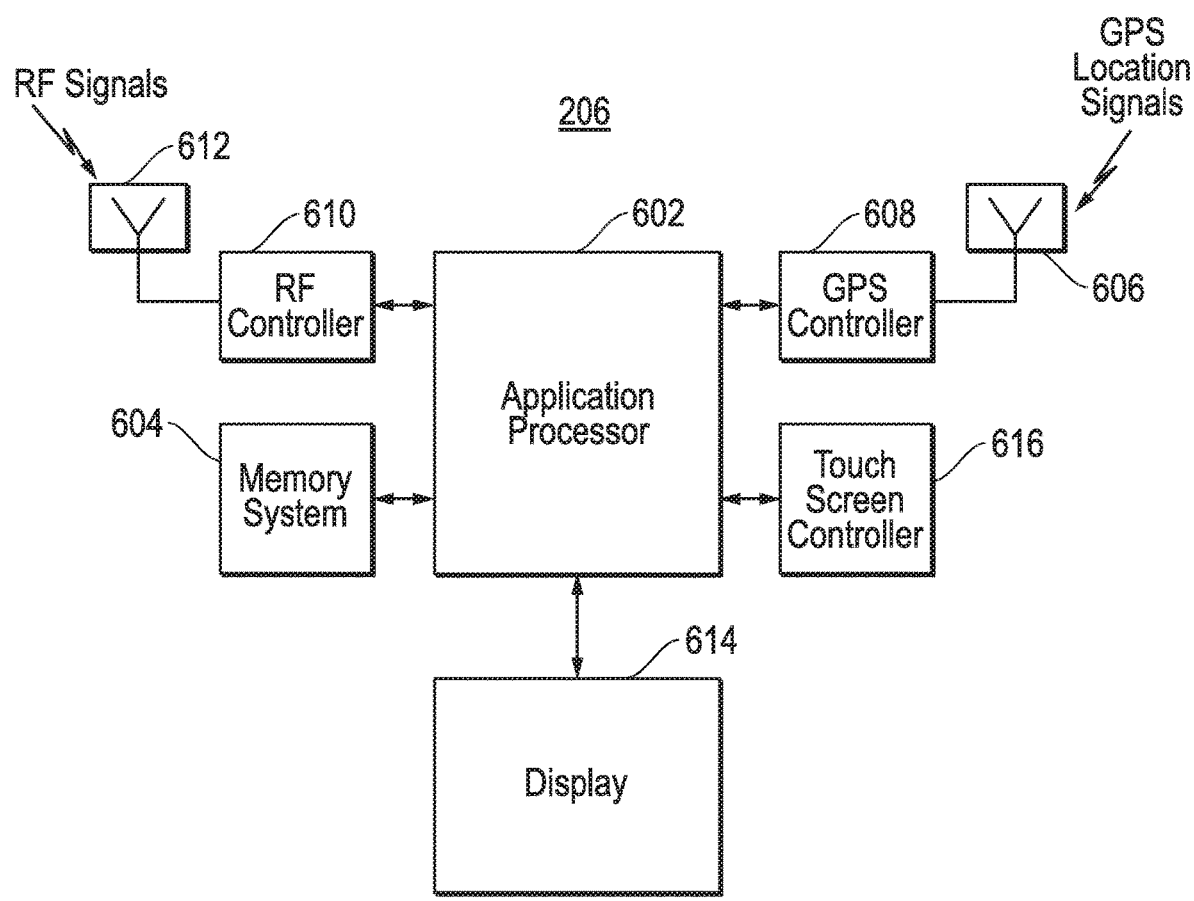
FIG. 6 is block diagram illustrating relevant components of an example smart phone employing one embodiment of the present invention.

FIG. 6 is a block diagram illustrating components of an example smart phone 206. In the embodiment shown in FIG. 6, smart phone 206 includes an application processor 602, which is configured to execute instructions of applications, including a tracking device location application, stored within memory system 604. Smart phone 206 further includes a GPS controller circuit 608 that receives analog signals from antennae 606, which represent GPS signals received from GPS satellites. In one embodiment, GPS controller 608 provides digital equivalents of the GPS signals to application processor 602 for further processing in accordance with the instructions of an application stored in memory 604 to generate smart phone 206 GLs. Smart phone 206 further includes an RF controller circuit 610 that receives analog signals from RF antennae 612, which represent RF signals from tracking devices tracking devices 201 and 202. RF controller 610 provides digital signal equivalents of the RF signals to application processor 602 for subsequent processing in accordance with the instructions of the location search application stored in memory system 604. Application processor 602 is configured to provide geographical locations for of a tracking device, such as tracking device 201, to a mapping function, which may take form in processor 602 executing instructions of another application stored in memory 604. The output of the mapping function can be provided to display 614, which in turn displays a map like the map shown in FIG. 4. Although not shown, additional components such as a display controller, may be included in the path between processor 602 and display 614. A touch screen controller 616 is responsive to input provided by the user of smart phone 206 via display 614.

Figure 7:
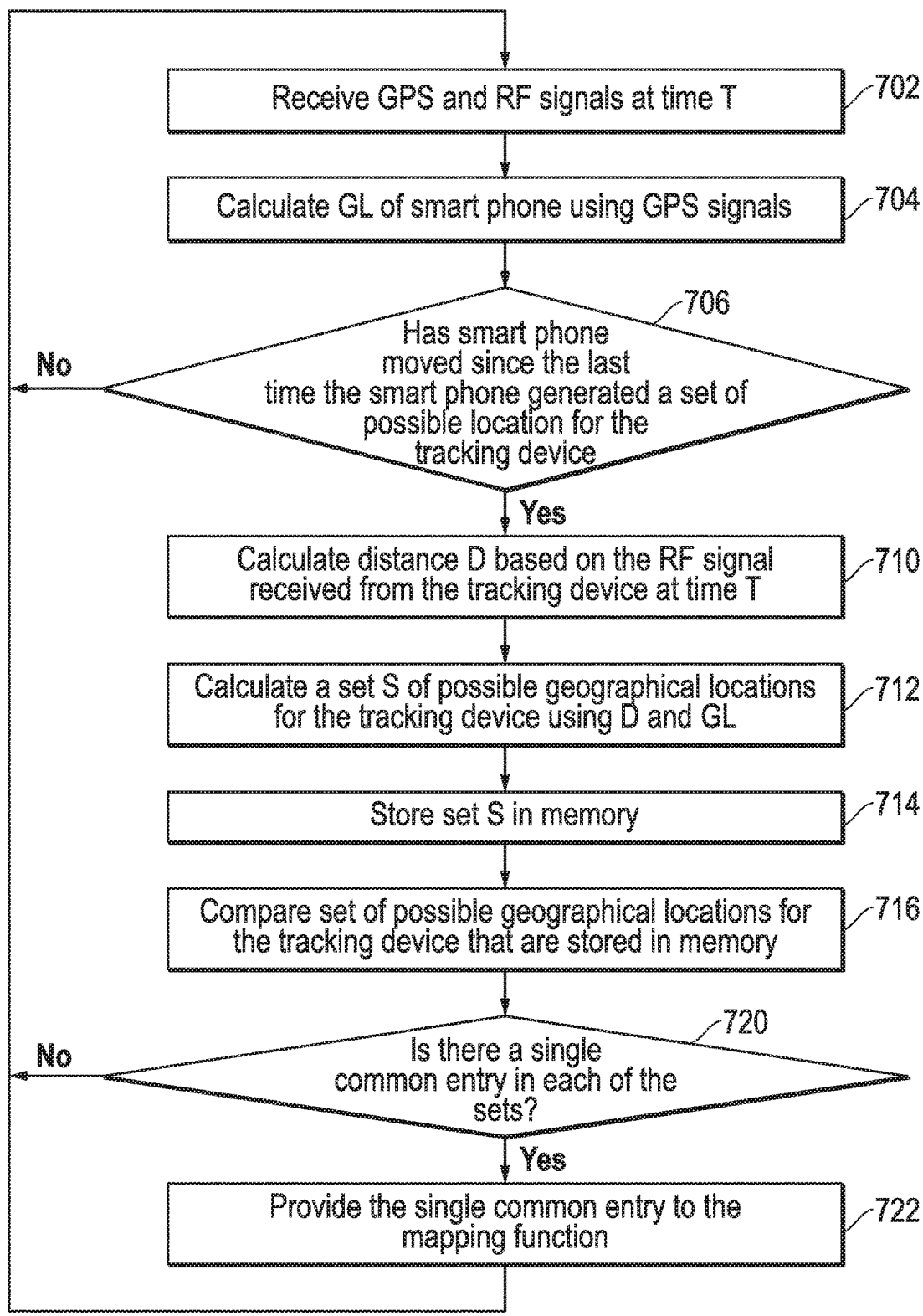
FIG. 7 is a flow chart illustrating relevant aspects of an example process executed by the processor shown in FIG. 6 in accordance with one embodiment of the present invention.

As noted, smart phone 206 can calculate the geographical location of tracking device 201 in response to receiving GPS signals and RF signals from tracking device 201. The geographical location can be calculated in accordance with instructions of the location search application stored in memory system 604. FIG. 7 is a flow chart that describes relevant aspects of an example process implemented by processor 602 when it executes instructions of the location search application. It is noted that the location search application can be downloaded to memory system 604 from a computing device such as a server that is in data communication with smart phone 206.

With continuing reference to FIG. 7, the process begins when processor 602 receives the digital equivalents of the RF and GPS signals at time T. Processor 602 or another component of smart phone 206, uses the GPS signals to determine smart phone 206's current geographical location GL. It is noted that the current GL can be calculated independently of the location search application and provided thereto.

The process of generating sets of possible geographical locations of tracking device 201, storing the sets in memory 604, and comparing the sets for common entries, can be processor and memory intensive. To reduce the load on processor 602 and the amount of memory 604 used to store the sets, in one embodiment, steps 710-722 should be implemented only if smart phone 206 has moved a sufficient distance from the geographical location it occupied when it last implemented steps 710-720. Processor 602 makes this determination by comparing the distance between GL calculated in step 704 and the GL mapped to the most recently stored set of possible geographical locations for tracking device 201. If the distance between the GLs exceeds a predetermined value, the process proceeds to step 710. Otherwise step 702 is repeated.

In step 710, processor 602 uses the RF signal received in step 702 to determine the distance D between smart phone 206 and tracking device 201. Although not shown in FIG. 7, the step of generating an RSSI based on the RF signal received in step 702. This RSSI is related to distance D as noted above. Processor 602 can use a look-up table to map RSSI to distance D. Alternatively, processor 602 can calculate distance D from RSSI using algorithms based on the relationship between the two that is described above. It is noted above that smart phone 206 may receive RF signals from several tracking devices. Each of the RF signals should include an identity of its respective tracking device. The identity of tracking devices can be extracted from corresponding RF signals. In some embodiments, smart phone 206 can be configured to generate a visual and/or audio alarm if the distance D determined in step 710 is greater than a predetermined threshold defined by a user of smart phone 206. Processor 602 maps D to the identity of tracking device 201 in memory 604.

At step 712, processor 602 calculates a set S of possible geographical locations for tracking device 201 based on distance D calculated in step 710 and GL calculated in step 704. In step 714, set S is stored in memory 604 and mapped to GL and the identity of tracking device 201. Thereafter processor 602 accesses sets in memory 604 that are mapped to tracking device 201 in step 716 to identify common geographical location entries. If processor 602 can identify a single geographical location that is common to three or more sets, processor 601 provides the common, single geographical location to a mapping function. The mapping function in turn generates a map for display that includes a visual indication of the item at the common geographical location.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method implemented by a mobile device (MD), the method comprising:
    receiving, by the MD, a first radio frequency (RF) signal transmitted by a first device while the MD is at a first geographical location;
    receiving, by the MD, a second RF signal transmitted by the first device while the MD is at a second geographical location, which is different from the first MD geographical location;
    determining, by the MD, a geographical location of the first device based on the first RF signal, the second RF signal, the first MD geographical location, and the second MD geographical location;
    generating, by the MD, an alarm if the second RF signal indicates that a distance between the MD and the first device exceeds a predetermined value specified by a user of the MD;
    calculating a first received signal strength indicator (RSSI) based on the first RF signal;
    calculating a second RSSI based on the second RF signal;
    receiving first geographical location signals while the MD device is at the first geographical location;
    determining the first MD geographical location based on the first geographical location signals;
    receiving second geographical location signals while the MD device is at the second geographical location;
    determining the second MD geographical location based on the second geographical location signals;
    calculating a first distance between the first device geographical location and the first MD geographical location based on the first RSSI;
    calculating a second distance between the first device geographical location and the second MD geographical location based on the second RSSI;
    calculating a first plurality of potential geographical locations for the first device based on the first distance and the first MD geographical location;
    calculating a second plurality of potential geographical locations for the first device based on the second distance and the second MD geographical location;

receiving a third RF signal transmitted by the first device while the MD is at a third geographical location, which is different from the first and second MD geographical locations;

calculating a third RSSI based on the third RF signal;

receiving third geographical location signals while the MD device is at the third geographical location;

determining the third MD geographical location based on the third geographical location signals;

calculating a third distance between the first device geographical location and the third MD geographical location based on the third RSSI;

calculating a third plurality of potential geographical locations for the first device based on the third distance and the third MD geographical location; and comparing the first, second, and third plurality of potential geographical locations for the first device;

wherein the geographical location of the first device is determined in response to comparing the first, second, and third plurality of potential geographical locations for the first device.

2. The method of claim 1 further comprising an act of storing the determined geographical location of the first device in memory, wherein the determined geographical location of the first device comprises a first device latitude and a first device longitude.

3. The method of claim 1 further comprising an act of displaying a visual indication of the first device geographical location on a map.

4. The method of claim 1, further comprising:

determining whether the third MD geographical location is different from the first and second MD geographical locations by comparing a distance between the third MD geographical location and both of the first and second MD geographical locations to a predetermined value; and if it is determined that the third MD geographical location is not different from the first and second MD geographical locations, waiting for the MD to move before calculating the third plurality of potential geographical locations for the first device and comparing the first, second, and third plurality of potential geographical locations for the first device.

5. A method comprising:

a computer system transmitting instructions to a mobile device (MD) for storage in memory thereof, wherein the mobile device implements a mobile method in response to executing the instructions, the mobile method comprising:

the MD receiving a first radio frequency (RF) signal transmitted by a first device while the MD is at a first geographical location;

the MD receiving a second RF signal transmitted by the first device while the MD is at a second geographical location, which is different from the first geographical location;

the MD determining a geographical location of the first device based on the first RF signal, the second RF signal, the first MD geographical location, and the second MD geographical location;

the MD generating an alarm if the second RF signal indicates that a distance between the MD and the first device exceeds a predetermined value specified by a user of the MD;

the MD calculating a first received signal strength indicator (RSSI) based on the first RF signal;

the MD calculating a second RSSI based on the second RF signal;

the MD receiving first geographical location signals while the MD device is at the first geographical location;

the MD determining the first MD geographical location based on the first geographical location signals;

the MD receiving second geographical location signals while the MD device is at the second geographical location;

the MD determining the second MD geographical location based on the second geographical location signals;

the MD calculating a first distance between the first device geographical location and the first MD geographical location based on the first RSSI;

the MD calculating a second distance between the first device geographical location and the second MD geographical location based on the second RSSI;

the MD calculating a plurality of potential first geographical locations for the first device based on the first distance and the first MD geographical location;

the MD calculating a plurality of potential second locations for the first device based on the second distance and the second MD geographical location;

the MD receiving a third RF signal transmitted by the first device while the MD is at a third geographical location, which is different from the first and second MD geographical locations;

the MD calculating a third RSSI based on the third RF signal;

the MD receiving third geographical location signals while the MD device is at the third geographical location;

the MD determining the third MD geographical location based on the third geographical location signals;

the MD calculating a third distance between the first device geographical location and the third MD geographical location based on the third RSSI;

the MD calculating a plurality of potential third geographical location for the first device based on the third distance and the third MD geographical location; and the MD comparing the potential first, second, and third plurality of geographical locations for the first device;

wherein the geographical location of the first device is determined in response to the MD comparing the potential first, second, and third plurality of geographical locations for the first device.

6. The method of claim 5 wherein the mobile method further comprises an act of displaying a visual indication of the first device geographical location on a map.

7. The method of claim 5, wherein the mobile method comprises:

determining whether the third MD geographical location is different from the first and second MD geographical locations by comparing a distance between the third MD geographical location and both of the first and second MD geographical locations to a predetermined value; and if it is determined that the third MD geographical location is not different from the first and second MD geographical locations, waiting for the MD to move before calculating the third plurality of potential geographical locations for the first device and comparing the first, second, and third plurality of potential geographical locations for the first device.

8. A non-transitory computer readable medium (CRM) comprising instructions, wherein a method is implemented by a mobile device (MD) in response to executing the instructions, the method comprising:
 receiving, by the MD, a first radio frequency (RF) signal transmitted by a first device while the MD is at a first location;
 receiving, by the MD, a second RF signal transmitted by the first device while the MD is at a second location, which is different from the first location;
 determining, by the MD, a geographical location of the first device based on the first RF signal, the second RF signal, the first MD geographical location, and the second MD geographical location;
 generating, by the MD, an alarm if the second RF signal indicates that a distance between the MD and the first device exceeds a predetermined value specified by a user of the MD;
 calculating a first received signal strength indicator (RSSI) based on the first RF signal;
 calculating a second RSSI based on the second RF signal;
 receiving first geographical location signals while the MD device is at the first location;
 determining the first MD geographical location based on the first geographical location signals;
 receiving second geographical location signals while the MD device is at the second location;
 determining the second MD geographical location based on the second geographical location signals;
 calculating a first distance between the first device geographical location and the first MD geographical location based on the first RSSI;
 calculating a second distance between the first device geographical location and the MD second geographical location based on the second RSSI;
 calculating a plurality of first potential geographical locations of the first device based on the first distance and the first MD geographical location;
 calculating a plurality of second potential geographical locations of the first device based on the second distance and the second MD geographical location;
 receiving a third RF signal transmitted by the first device while the MD is at a third location, which is different from the first and second MD geographical locations;
 calculating a third RSSI based on the third RF signal;
 receiving third positioning signals while the MD device is at the third geographical location;
 determining the third MD geographical location based on the third geographical location signals;
 calculating a third distance between the first device geographical location and the third MD geographical location based on the third RSSI;
 calculating a plurality of third potential geographical locations of the first device based on the third distance and the third MD geographical location; and
 comparing the first, second, and third potential geographical locations of the first device;
wherein the geographical location of the first device is determined in response to comparing the first, second, and third potential geographical locations of the first device.

9. The CRM of claim 8 wherein the method further comprises an act of displaying a visual indication of the first device geographical location on a map.

10. The method of claim 8 wherein the method further comprises:
 determining whether the third MD geographical location is different from the first and second MD geographical locations by comparing a distance between the third MD geographical location and both of the first and second MD geographical locations to a predetermined value; and
 if it is determined that the third MD geographical location is not different from the first and second MD geographical locations, waiting for the MD to move before calculating the third plurality of potential geographical locations for the first device and comparing the first, second, and third plurality of potential geographical locations for the first device.

* * * * *